US012030765B2

(12) United States Patent
Farfalli

(10) Patent No.: US 12,030,765 B2
(45) Date of Patent: Jul. 9, 2024

(54) CORKSCREW WITH PROPPING LEVER AND METHOD FOR THE EXTRACTION OF A CORK

(71) Applicant: Daniele Farfalli, Vajont (IT)

(72) Inventor: Daniele Farfalli, Vajont (IT)

(*) Notice: Subject to any disclaimer, the term of this patent is extended or adjusted under 35 U.S.C. 154(b) by 308 days.

(21) Appl. No.: 17/772,744

(22) PCT Filed: Oct. 29, 2020

(86) PCT No.: PCT/EP2020/000184
§ 371 (c)(1),
(2) Date: Apr. 28, 2022

(87) PCT Pub. No.: WO2021/083540
PCT Pub. Date: May 6, 2021

(65) Prior Publication Data
US 2022/0388827 A1 Dec. 8, 2022

(30) Foreign Application Priority Data
Oct. 30, 2019 (IT) ........................ 102019000020090

(51) Int. Cl.
*B67B 7/04* (2006.01)

(52) U.S. Cl.
CPC .................................. *B67B 7/0429* (2013.01)

(58) Field of Classification Search
CPC ...... B25F 1/00; B25F 1/04; B25F 1/02; B67B 7/44; B67B 7/18; B67B 7/00; B67B 7/16; B67B 7/04; B67B 7/06; B67B 7/0405; B67B 7/0423; B67B 7/0429; B67B 7/066; B67B 7/02; Y10T 29/49822; Y10T 29/539; B25B 33/00; B25B 27/14; B25B 27/0028; B25B 27/0458; B25G 3/32; B25G 1/085
See application file for complete search history.

(56) References Cited

U.S. PATENT DOCUMENTS

| | | | | |
|---|---|---|---|---|
| 7,377,196 B1 * | 5/2008 | Chen | B67B 7/0429 81/3.47 |
| 7,614,323 B2 * | 11/2009 | Warner | B67B 7/0429 81/3.47 |

FOREIGN PATENT DOCUMENTS

| | | | | |
|---|---|---|---|---|
| EP | 3287414 A1 | 2/2018 | |
| EP | 3459905 A1 * | 3/2019 | B67B 7/0423 |
| FR | 2689115 A1 | 10/1993 | |
| WO | 2005068348 A1 | 7/2005 | |

OTHER PUBLICATIONS

International Search Report for corresponding PCT/EP2020/000184, dated Jan. 25, 2021.
Written Opinion of the International Searching Authority for corresponding PCT/EP2020/000184, dated Jan. 25, 2021.
International Preliminary Report on Patentability, with Annexes, for corresponding PCT/EP2020/000184, dated Jan. 10, 2022.

* cited by examiner

*Primary Examiner* — Robert J Scruggs

(74) *Attorney, Agent, or Firm* — Egbert, McDaniel & Swartz, PLLC

(57) ABSTRACT

Disclosed is a corkscrew extraction of a cork from a neck of a bottle, including a body, a propping lever, an extraction screw for extraction of the cork, wherein the corkscrew is provided with an extension element of the extraction screw. An extraction method with two sub-phases of a cork from a neck of a bottle by continuous movement without interruptions is also disclosed.

18 Claims, 8 Drawing Sheets

CORKSCREW WITH PROPPING LEVER AND METHOD FOR THE EXTRACTION OF A CORK

TECHNICAL FIELD

The present invention relates to a corkscrew with propping lever and relative extraction method according to the characteristics of the pre-characterizing portion of the respective claims.

PRIOR ART

In the field of production of corkscrews suitable for the extraction of corks made from cork oak, of silicone or of similar materials from the neck of a bottle, particular importance have the corkscrews of the switchblade pocket type, possibly provided with cutting blade of the cover capsule of the end portion of the neck of the bottle and/or possibly provided with extraction elements of crown corks.

Corkscrews of this type are known in a considerable variety of forms and configurations.

Solutions are known with single propping lever and with double propping lever.

Solutions with single propping lever involve the use of a very long lever which is provided with two couples of bearing teeth arranged in different positions along the extension in length of the lever, in such a way that a first series of teeth is useful for the first part of the extraction phase of the cork from the neck of the bottle and a second series of teeth is useful for the second part of the extraction phase of the cork from the neck of the bottle, when the first phase is completed and the position of the first series of teeth does not allow to complete the extraction.

Among the many configurations the corkscrew FR2689115 is known which provides in the propping lever for the bearing on the neck of the bottle, a lever subdivided into arm and forearm, instead of a single propping lever, in which in the arm a hook is internally provided to remove the crown corks and above this a bearing tooth for propping the bottle neck for a first extraction of the cork and, with end pivoting, a second extension lever or forearm with a second bearing tooth for propping until completion of the extraction of the cork. This solution is suitable for the extraction with the help of the screw or gimlet spiral of corks from the bottles, also when they are partially extracted by means of the action with the first lever, to facilitate the completion of the extraction, precisely by means of the second openable lever.

Among the various configurations the one disclosed in WO2005068348 is also known, in the name of the same applicant, in which a corkscrew with double propping lever is described, associated with a screw for extraction of the cork, in which the double propping lever has a first base lever hinged to the handle of the corkscrew, and a second extension lever for the propping hinged to the end of the first base lever, and in which the second extension lever for propping has internally two propping bearing teeth, one at the end and one which is more retracted.

The application EP 3 287 414 describes a corkscrew having a spiral provided with a free end for introduction into a cork to be removed from a bottle and a connecting end opposite to the free end. The corkscrew further includes a guide for the spiral which is provided with a first seat for the housing of the connecting end in an extraction start position and a second seat for the housing of the connecting end in a removal end position. The guide is made in the form of a slot obtained on a support of the spiral. The support of the spiral consists of an oblong body hinged on the handle of the corkscrew in a hinging point. The support includes a seat for insertion of a head of the spiral according to a “U” configuration. On the head of the spiral a pin is obtained which is inserted within the slot. The pin slides within the slot between the two end positions of the slot, guiding the movement of the spiral which rotates around the pin, while the support rotates around the respective hinging point.

The application U.S. Pat. No. 7,377,196 describes a corkscrew comprising a supporting element having two opposite sliding slits or slots, a movable rod sliding in the slits of the supporting element, a bearing element and a screw element mounted on the supporting element, a cover mounted on the support and a traction handle mounted in a pivoting way on the cover and comprising a tongue between the sliding slits of the supporting element and the movable rod. The angle between the handle and the supporting element is adjustable. In particular, the supporting element includes two rectilinear opposite slits or slots for the sliding of the movable rod which consists of a pin which engages within the two slots. The bearing element is used for the bearing on the edge of the neck of the bottle and is mounted in a revolving way on the supporting element. The handle has a first end mounted in a revolving way on the cover and is shaped with a protrusion or tongue placed between the sliding slits or slots of the supporting element and the movable rod or pin. The supporting element has a first end provided with an extension with two side walls, on each one of which a respective sliding slit or slot being obtained. The first end of the supporting element is shaped with a receiving hollow to receive the first end of the handle. The extension of the supporting element has a U-shaped profile in transverse section. The movable rod or pin is movable in the extension and is guided by the slits or slots. The cover contains the supporting element and hides it from view. The tongue of the traction handle is perpendicular to the supporting element and the tongue is movable in the extension to obtain a bearing condition on the movable rod or pin. In this way, the handle is revolving with respect to the supporting element between a first position in which the handle is aligned with the supporting element and the tongue is spaced from the movable rod or pin, and a second position in which the handle is inclined with respect to the supporting element and the tongue is put on the movable rod or pin. In operation, the screw element is screwed into a cork and the bearing element rests on the neck of the bottle. Therefore, the handle is pulled upward with respect to the supporting element to extract the cork. When the handle reaches the greatest rise angle and the user can no longer easily exert the traction force, the handle is initially pressed downward and then pulled upward. When the handle is pressed downward, the tongue is moved toward the movable rod or pin to push the movable rod until the tongue crosses a first side of the movable rod and abuts on a second side of the movable rod. When the handle is pulled upward, the tongue is moved to rest on the movable rod to reduce the rise angle of the traction handle, so that the user can pull the handle upward and complete the extraction of the cork.

Problems of Prior Art

The solutions with single propping lever with two couples of bearing teeth have a first disadvantage given by the fact that necessarily the extraction of the cork from the neck of the bottle requires the execution of two separate phases, because the first phase is not suitable for completing the extraction for the reduced distance between the first series of bearing teeth and the base of the extraction screw while, by using only the second series of teeth, it is not possible to start the extraction of the cork because the distance between the second series of bearing teeth and the base of the extraction screw is excessive. Furthermore, such solutions are constructively more complex and expensive besides being little efficient, as risks are also present of loss of bearing of the teeth on the neck of the bottle during the extraction phases of the cork.

The corkscrew devices with double propping lever with a main bearing tooth on the arm and a secondary bearing tooth on the forearm are subject to a wearing of the main bearing tooth because of the fixing appendix of the second lever or arm, which appendix, in the initial phase of the extraction operation comes into contact with the edge of the bottle trying to drag the main bearing tooth outwards. This occurs because during the extraction, for a vertical exit of the cork, the propping lever must forcedly tilt starting from an initial condition of parallelism with the extraction screw, with consequent wearing of the main bearing tooth.

The solution disclosed in WO2005068348, though solving at least partially the problems of prior art, has itself drawbacks because, during the extraction operations of the cork, the hinging between the two levers is subject to a clearance which may also involve the loss of the bearing during the phase of exertion of the force of extraction of the cork.

AIM OF THE INVENTION

The aim of this invention is to supply a corkscrew with single propping lever and an extraction method, in which the lever associated to an extraction screw of the cork from the neck of the bottle, is able to accomplish the extraction process in a single phase without the need to move the propping lever on different positions. Furthermore, aim of the invention is to allow the extraction of the cork in a single extraction movement without the need to accomplish the operation in two different phases which involve the interruption of the extraction of the cork after a first extraction phase to place the corkscrew again at the limit of the maximum stroke of the first extraction phase, for the purpose of proceeding with a second extraction sub-phase, as it occurs in the traditional corkscrews with double lever or with single lever, but provided with double series of bearing teeth on the neck of the bottle.

CONCEPT OF THE INVENTION

The aim is reached with the characteristics of the main claim. The sub-claims represent advantageous solutions.

Advantageous Effects of the Invention

The solution according to the present invention, through the considerable creative contribution the effect of which constitutes an immediate and not negligible technical progress, has various advantages.

First of all, the risk is reduced of loss of the bearing of the propping lever during the phase of exertion of the force of extraction of the cork.

Moreover, though maintaining a solution having overall low costs, there is an increase in reliability of the extraction operation and duration of the corkscrew which is advantageously less subject to wearing.

Furthermore, there is an increase in the flexibility of the corkscrew and the reliability of the extraction operation.

DESCRIPTION OF THE DRAWINGS

An embodiment solution is hereinafter described with reference to the enclosed drawings to be considered as a non-limitative example of the present invention in which.

DESCRIPTION OF THE INVENTION

Figure 1:
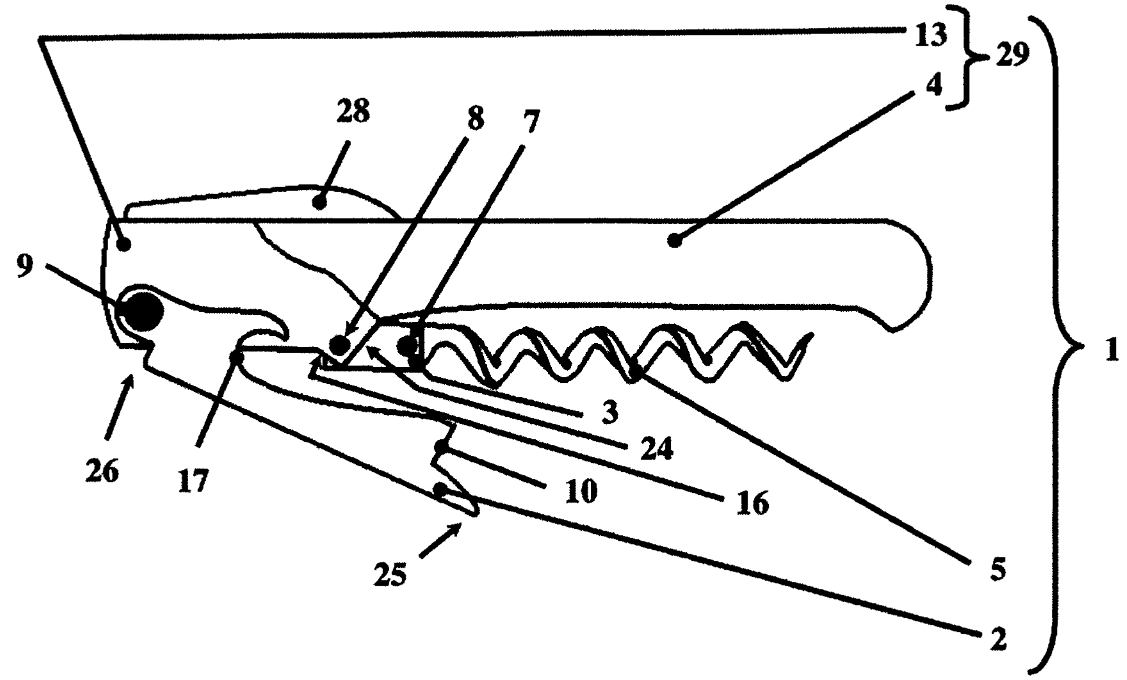
FIG. 1 represents a side schematic view of the corkscrew made according to the present invention in complete closure condition.
Figure 2:
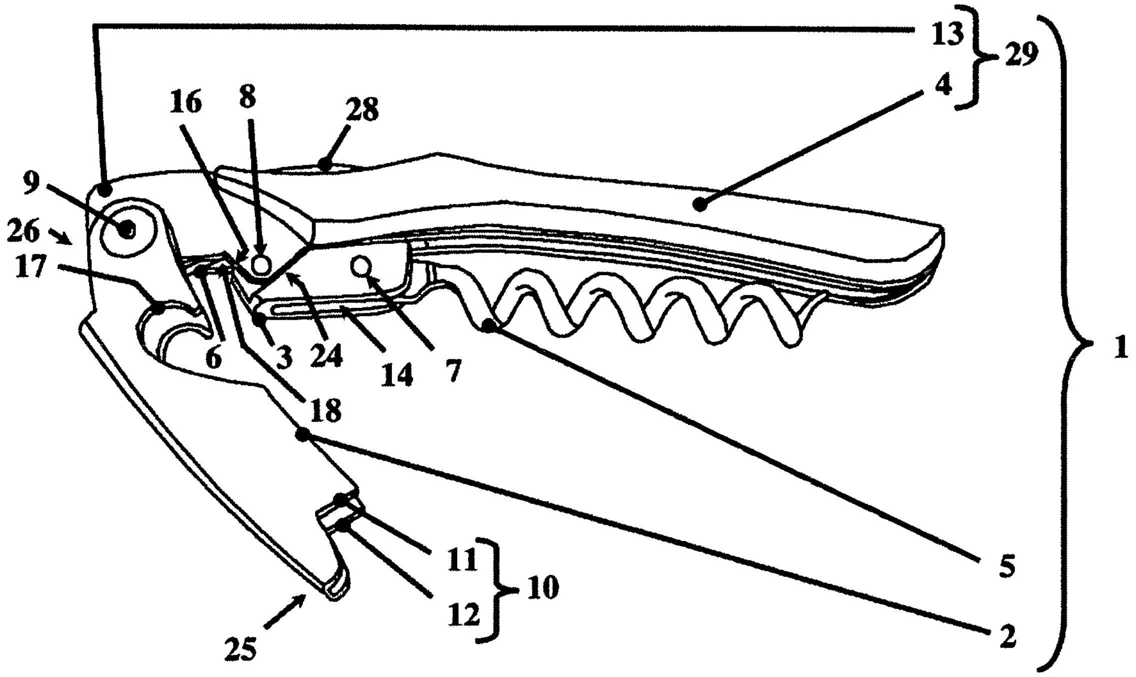
FIG. 2 represents a perspective schematic view of the corkscrew made according to the present invention in partial opening condition.
Figure 3:
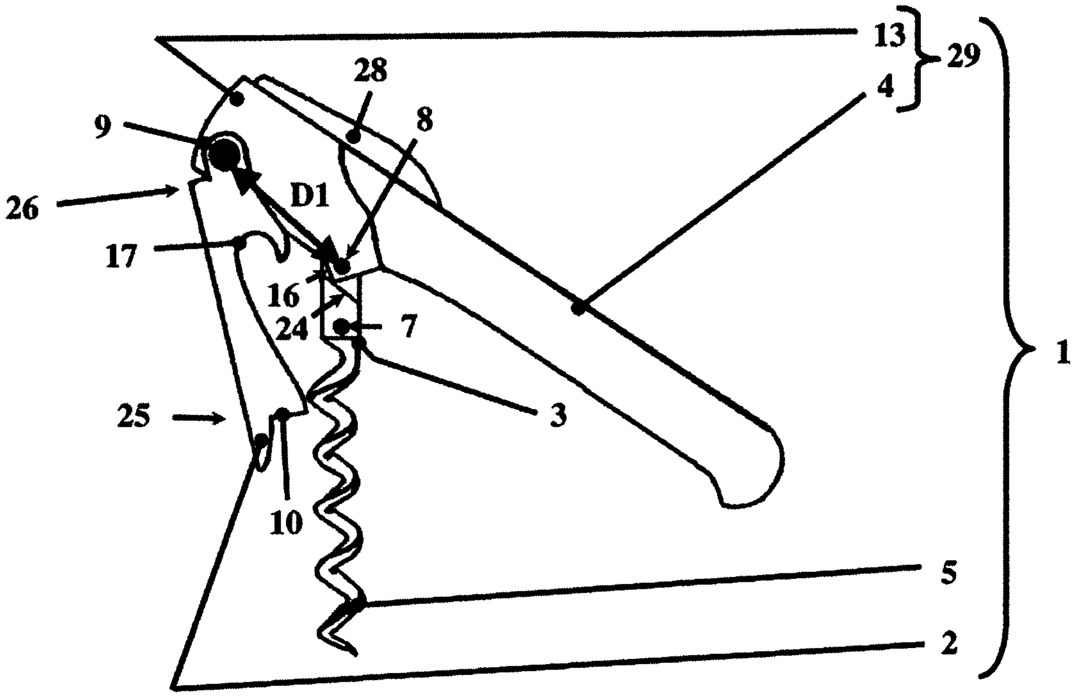
FIG. 3 represents a schematic view of the corkscrew of FIG. 1 in open condition.
Figure 4:
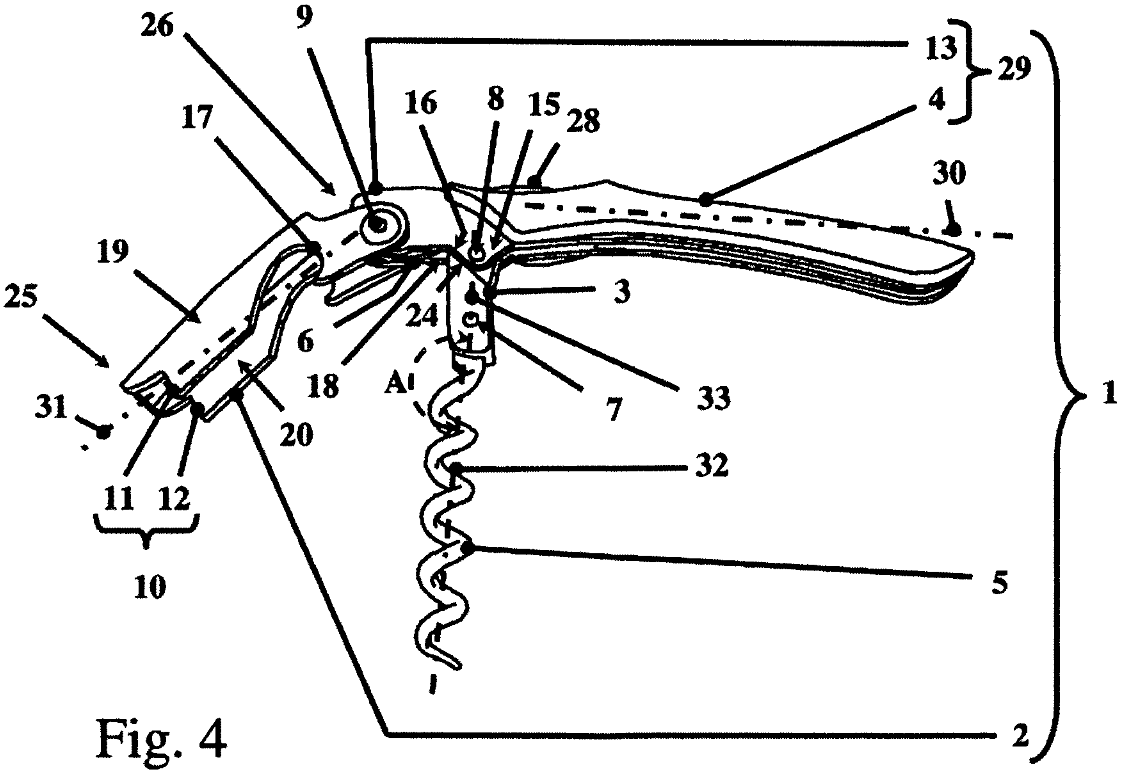
FIG. 4 represents a schematic view of the corkscrew of FIG. 2 in open condition.
Figure 5:
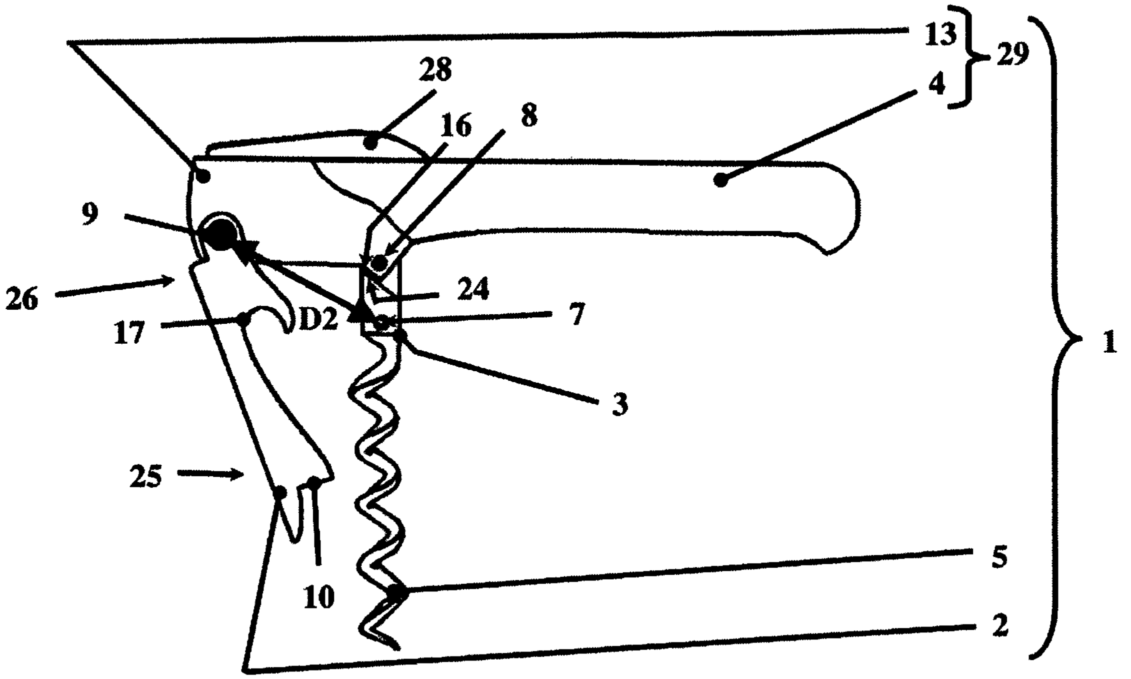
FIG. 5 represents a schematic view of the corkscrew of FIG. 1 in one of the conditions of use.
Figure 6:
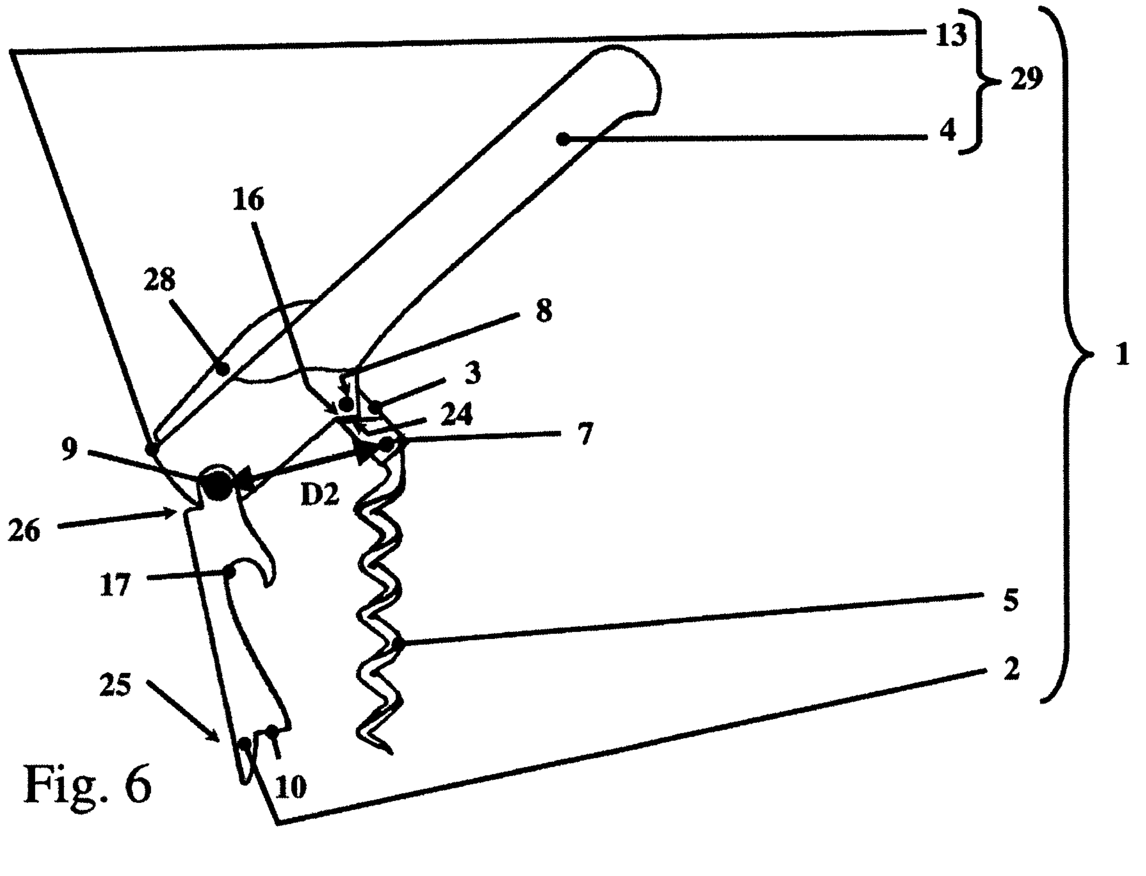
FIG. 6 represents a schematic view of the corkscrew of FIG. 1 in one additional condition of use.
Figure 7:
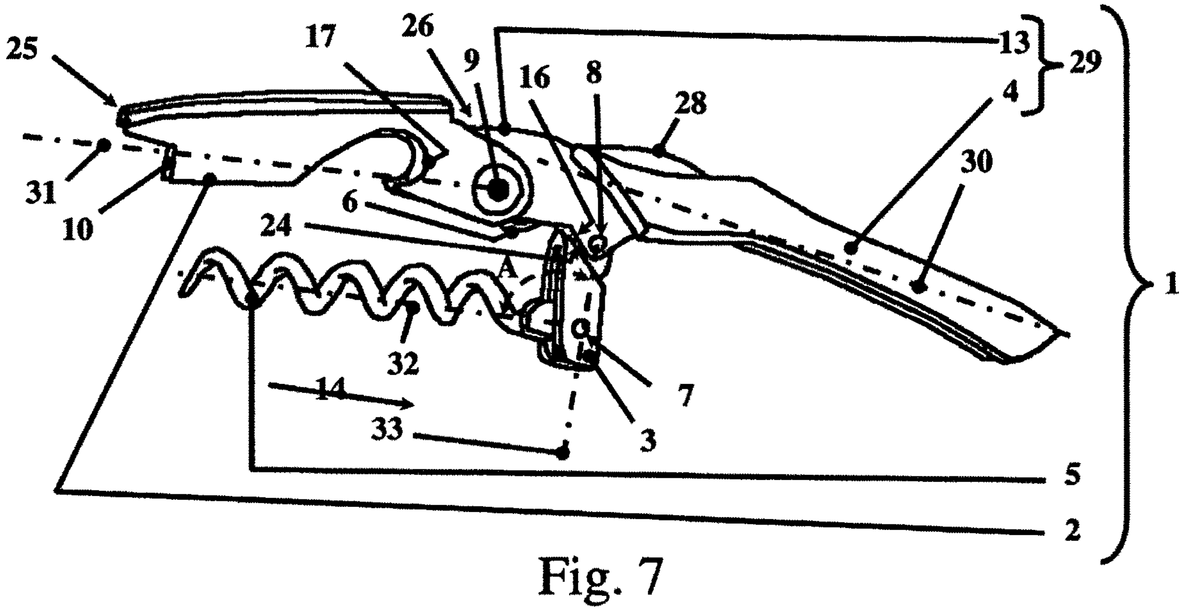
FIG. 7 represents a schematic view of the corkscrew of FIG. 2 in one of the conditions of use.
Figure 8:
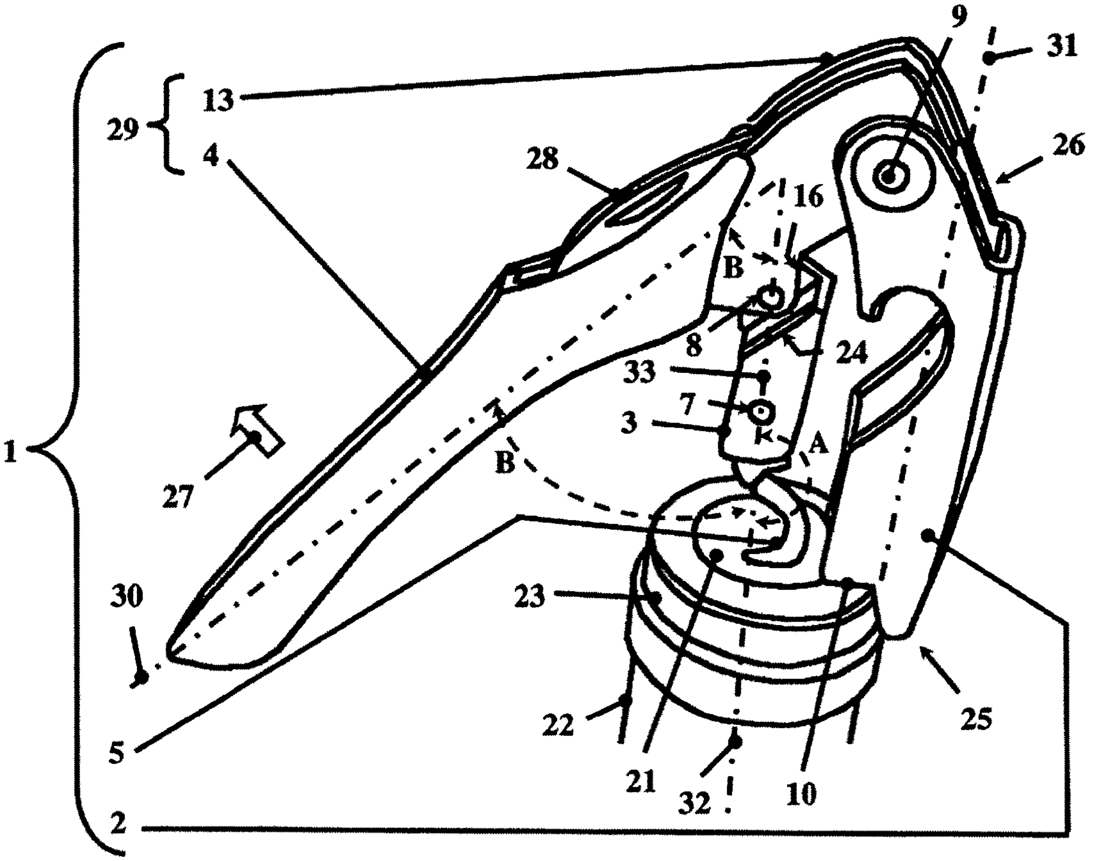
FIG. 8 represents a schematic view of the corkscrew of FIG. 2 in a condition of preparation of the extraction phase of the cork.
Figure 9:
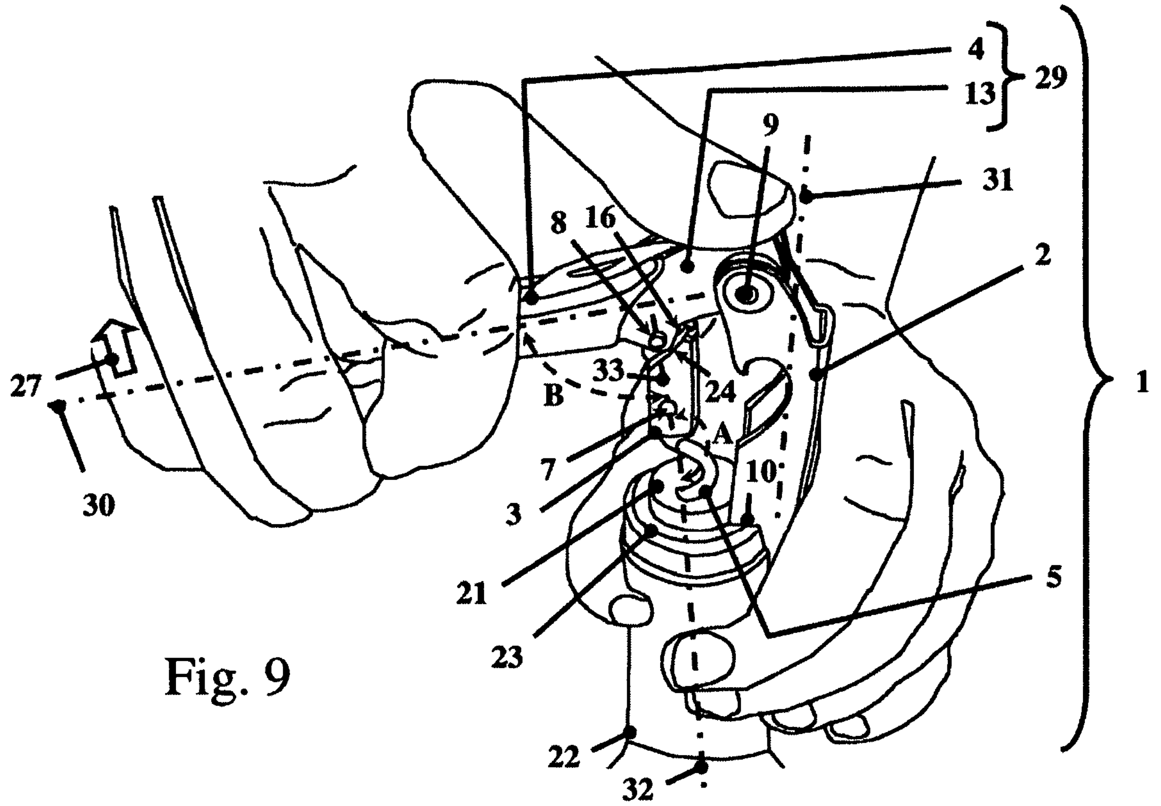
FIG. 9, FIG. 10, FIG. 11, FIG. 12, FIG. 13, FIG. 14 represent schematic views of the corkscrew of FIG. 8 during the execution of the extraction phases of the cork.
Figure 10:
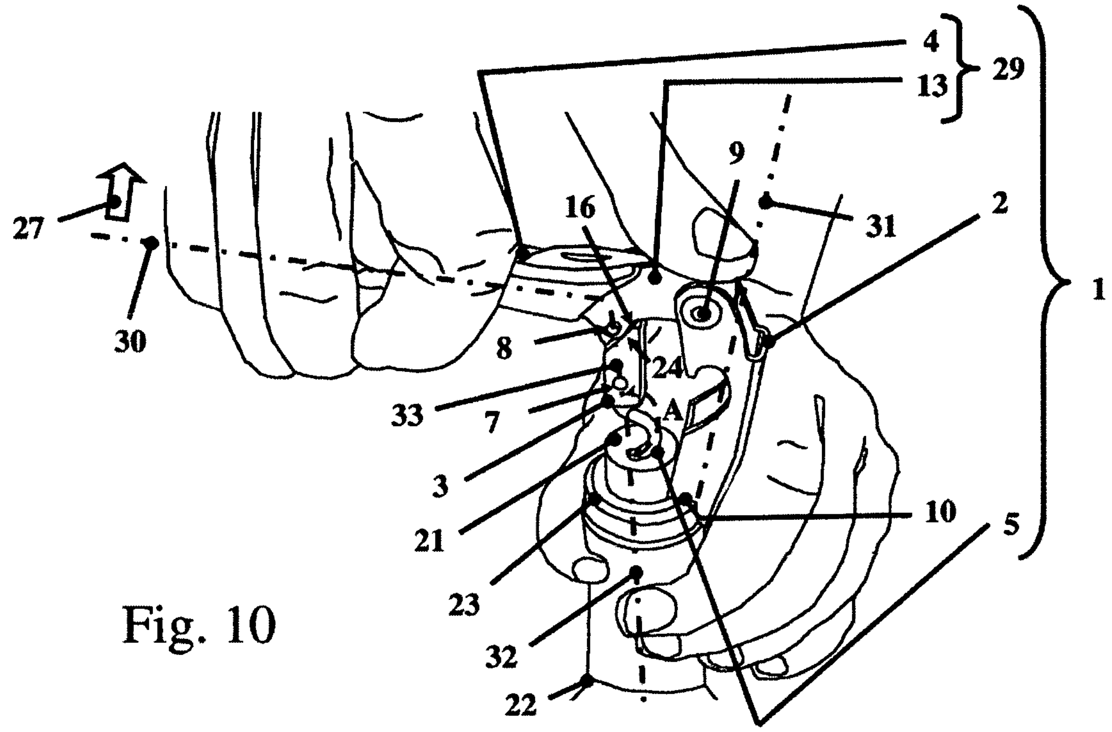
Figure 11:
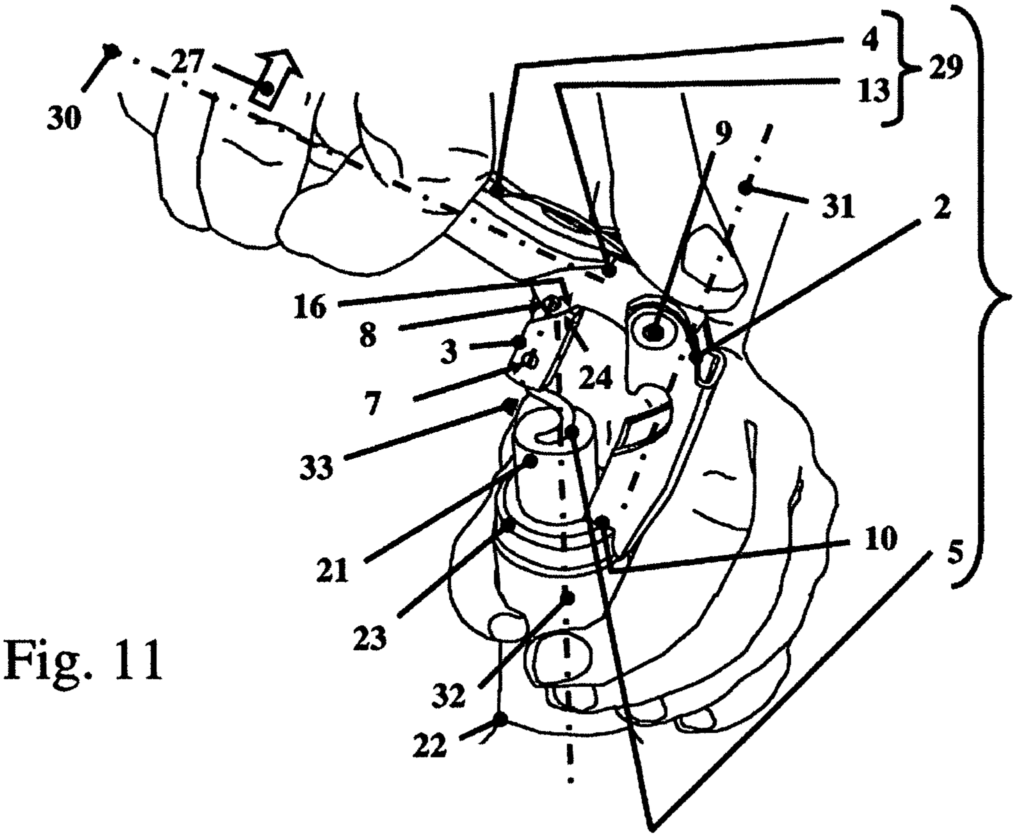
Figure 12:
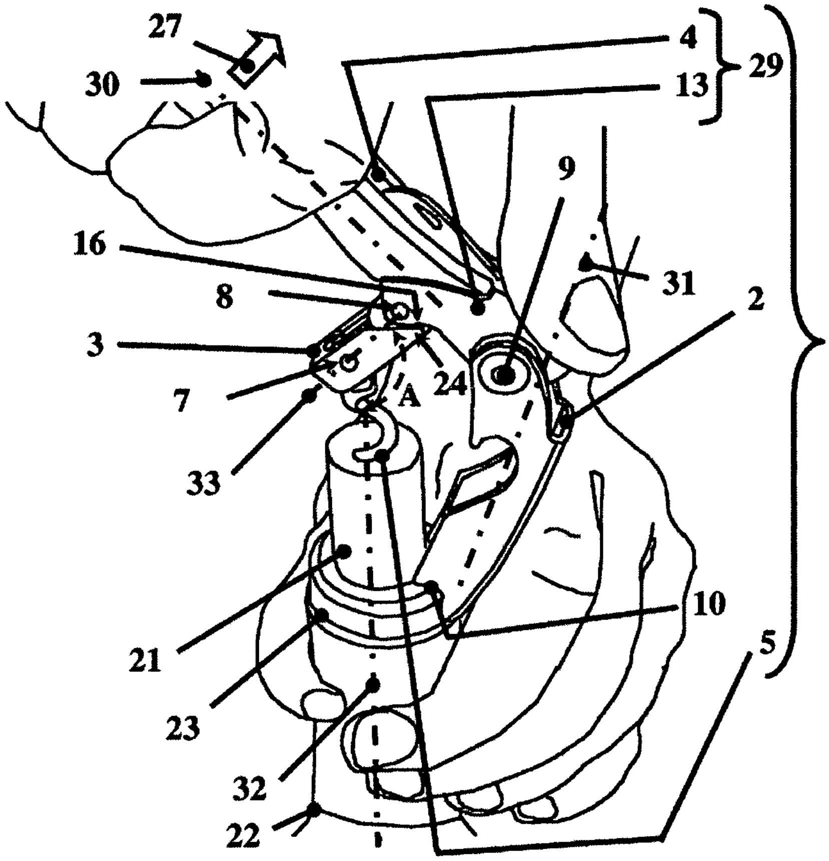
Figure 13:
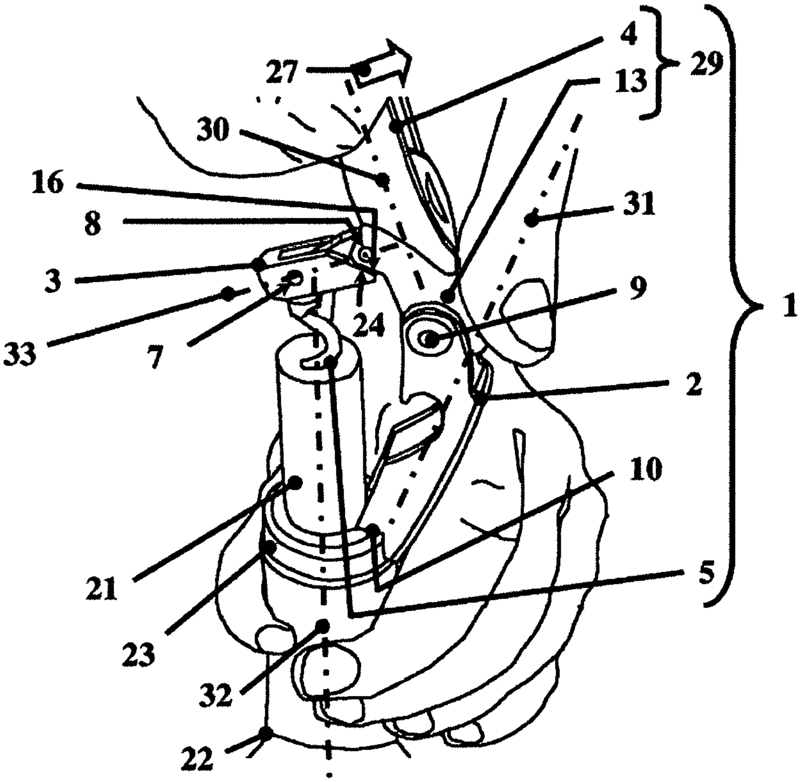
Figure 14:
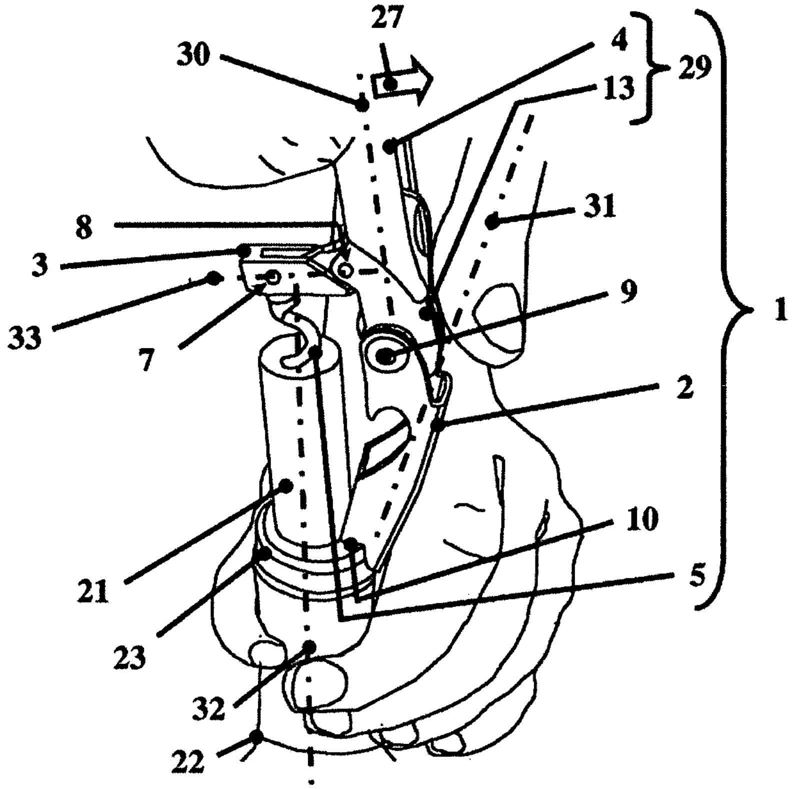

With reference to the figures (FIG. 1, FIG. 2, FIG. 3, FIG. 4, FIG. 5, FIG. 6, FIG. 7) the corkscrew (1), according to the present invention, includes a lever (2) which is applied on a body (29) of the corkscrew (1) and an extraction screw (5) applied on a body (29) of the corkscrew (1) as well. The body (29) includes a head (13) and a handle (4) or handgrip having an elongated shape, in which the head (13) constitutes a prolongation of the elongated shape of the handle (4) or handgrip.

The lever (2) is hinged on the head (13) in correspondence with a respective hinge (9), which allows a rotation of the lever (2) with respect to the handle (4) both for switchblade closure of the lever (2) itself in a proximity condition with the handle (4), and for allowing a reciprocal rotation between the lever (2) and the handle (4) during the extraction phase (FIG. 8, FIG. 9, FIG. 10, FIG. 11, FIG. 12, FIG. 13, FIG. 14) of a cork (21) from the neck of a bottle (22). The lever (2) has an elongated shape delimited by a first end (25) provided with propping teeth (10) and by a second end (26) in correspondence with which there is the hinge (9). The propping teeth (10) include a first tooth (11) and a second tooth (12). During the extraction phase of the cork from the bottle, the propping teeth (10) are located (FIG. 1, FIG. 2, FIG. 3, FIG. 4, FIG. 5, FIG. 6, FIG. 7) on the lever (2) in correspondence with the side of the lever (2) which faces the extraction screw (5). The lever (2) is shaped (FIG. 2, FIG. 4) with an essentially "U" shaped section, in which the end sides of the "U" shape form a first flank (19) and a second flank (20) which are essentially parallel, on each one of which a respective tooth of the propping teeth (10) is obtained. In particular on the first flank (19) the first tooth (11) is obtained and on the second flank (20) the second tooth (12) is obtained, in such a way that the first tooth (11) and the second tooth (12) form a couple of reciprocally parallel propping teeth (10). The teeth (10, 11, 12) are used for engagement (FIG. 8, FIG. 9, FIG. 10, FIG. 11, FIG. 12, FIG. 13, FIG. 14) of the corkscrew (1) on the edge (23) of the neck of the bottle (22) during the extraction phases of the cork (21). The "U" shape of the lever (2) allows a reduction of the encumbrance when the corkscrew (1) must be put away, because the lever (2) can be thus folded on the body (29) receiving a portion of it within the hollow defined by the "U" shape.

The corkscrew (1) can be without or can be provided with further accessory elements to be considered optional and irrelevant for the purposes of the present invention, such for example a blade (28), little knives or other cutting tools for example small wheels, of the type extractable from the handle (4), for the removal of the coating of the neck of the bottle according to known art.

The corkscrew (1) can be without or can be provided with further accessory elements to be considered optional and irrelevant for the purposes of the present invention, such as for example traditional opening hooks (17) for crown corks. Obviously, several embodiments are possible of the opening hooks (17) for crown corks which can also have the shape of an opening crotchet arranged on the lever (2) or on the handle (4).

The shape of the extraction screw (5) can be made according to known art. The extraction screw (5) has an elongated shape which develops along a respective axis of the screw (32).

The extraction screw (5) is not directly fixed to the body (29) of the corkscrew (1) and is fixed to the body (29) of the corkscrew (1) with interposition of an extension element (3) according to a configuration in which:

the extension element (3) is fixed in a revolving way to the body (29) in a first fulcrum point (8) which allows a rotation of the extension element (3) with respect to the body (29). In particular the extension element (3) is fixed to the body (29) in correspondence with the head (13) in a position which is between the hinge (9) of the lever (2) and the handle (4).

the extraction screw (5) is fixed in a revolving way to the extension element (3) in a second fulcrum point (7) which allows a rotation of the extraction screw (5) with respect to the extension element (3).

The extension element (3) develops in length according to an axis (33) of the extension element, corresponding to the axis passing through first fulcrum point (8) and second fulcrum point (7). In the embodiment shown (FIG. 4) the first fulcrum point (8) is located on a protrusion (15) of the head (13) in which the protrusion (15) protrudes with respect to the body (29) so as to create a misalignment between the axis (30) of the body of the corkscrew (1) and the connection axis between the hinge (9) and the first fulcrum (8).

In correspondence with the first fulcrum point (8) of fixing in a pivoting way on the body (29), the extension element (3) is provided with a respective flattened terminal end of the extension element (3) in which this end is introduced within a corresponding insertion free space (18) obtained in the head (13) of the body (29), in such a way that this flattened terminal end is inserted in the free space (18) which guides the movement during the rotation around the first fulcrum point (8), obtained by means of a first pin passing through a couple of holes obtained in the head (13) and a hole obtained on the flattened terminal end of the extension element (3). It will be evident that it is possible to also use a configuration opposite to the one described, without going beyond the scope of the present invention, in which the terminal end of the extension element (3) is provided with a first fork within which a portion of the head (13) is inserted to perform the fixing in the first fulcrum point (8).

In correspondence with the second fulcrum point (7) of fixing in a revolving way on the extension element (3), the extraction screw (5) is provided with a terminal end of the screw with flattened section, in which this end is inserted within a corresponding insertion seat (14) obtained in the extension element (3), in such a way that this flattened terminal end is inserted in the seat (14) which guides its movement during the rotation around the second fulcrum point (7) obtained by means of a second pin passing through a couple of holes obtained in the extension element (3) and a hole obtained on the flattened terminal end of the extraction screw (5). It will be evident that it is possible to also use a configuration opposite to the one described, without going beyond the scope of the present invention, in which the terminal end of the extraction screw (5) is provided with a second fork within which a portion of the extension element (3) is inserted to perform the fixing in the second fulcrum point (7). Advantageously, the presence of the extension element (3) and of the two fulcrum points (7, 8) allows to obtain different position configurations of the extraction screw (5) including:

a first position configuration (FIG. 3, FIG. 4, FIG. 5, FIG. 8, FIG. 9, FIG. 10) of the extraction screw (5) is related to a first sub-phase of the extraction process which is carried out for the extraction of the first portion of the cork (21) inserted in the neck of the bottle (22), starting its extraction from the initial position with the cork completely inserted within the neck of the bottle, raising the handle (4) acting on it, maintaining the lever (2) in engagement condition with the teeth (10) resting on the edge (23) of the neck of the bottle;

a second position configuration (FIG. 6, FIG. 7, FIG. 11, FIG. 12, FIG. 13, FIG. 14) of the extraction screw (5) is related to a second sub-phase of the extraction process which is carried out for the extraction of the second portion of cork (21) inserted in the neck of the bottle (22), continuing its extraction from the limit position of intervention of the first configuration, always in a condition in which the lever (2) is maintained in engagement condition with the same teeth (10) of the first configuration resting on the edge (23) of the neck of the bottle.

Thanks to the configuration described, it is possible to extract the cork (21) in a single extraction movement without the need to carry out the operation in two different phases, which involve the interruption of the extraction of the cork after a first extraction sub-phase to place the corkscrew again at the limit of the maximum stroke of the first extraction sub-phase, for the purpose of proceeding with a second extraction sub-phase, as it occurs in the traditional corkscrews with double lever or with single lever, but provided with double series of bearing teeth on the neck of the bottle.

In the first position configuration (FIG. 3, FIG. 4, FIG. 5, FIG. 8, FIG. 9, FIG. 10) of the extraction screw (5), the extraction screw (5) and the extension element (3) are reciprocally located in such a way that the axis of the screw (32) is parallel, preferably but not necessarily aligned, with respect to the axis (33) of the extension element, that is such that the axis of the screw (32) forms a first angle (A) with respect to the axis (33) of the extension element in which the first angle (A) has a first value which is equal to about 180°, possibly being able to have values included between 170° and 190°, without going beyond the scope of the present invention.

In the second position configuration (FIG. 6, FIG. 7, FIG. 11, FIG. 12, FIG. 13, FIG. 14) of the extraction screw (5), the extraction screw (5) and the extension element (3) are reciprocally located in such a way that the axis of the screw (32) forms a first angle (A) with respect to the axis (33) of the extension element, in which the first angle (A) has a second value which is lower with respect to the first value of the first angle (A) in the first configuration, for example included between 80° and 170°.

In practice, the extraction occurs in the first sub-phase (FIG. 3, FIG. 4, FIG. 5, FIG. 8, FIG. 9, FIG. 10), for approximately the first half of the cork (21), according to one configuration and with force ratios similar to those of a corkscrew of traditional type with double lever. The first sub-phase occurs by exerting (FIG. 9, FIG. 10) an opening force (27) on the handle (4) of the body (29). In that case, the extraction screw (5) and the lever (2) work in reciprocal synergy by means of rotation of the extraction screw (5) on the first fulcrum (8) and rotation of the lever (2) on the respective hinge (9), in which first fulcrum (8) and hinge (9) are spaced (FIG. 3) by a first distance (D1). In this phase the axis of the extension element (33) is maintained parallel, preferably aligned, with respect to the axis of the screw (32), in such a way that the extension element (3) and the extraction screw (5) rotate together as a single body around the first fulcrum (8). In this case the rotatory motion occurs involving a rotation of the assembly of extension element (3) and extraction screw (5) which rotate together with respect to the body (29) and also a reciprocal rotation between the body (29) and the lever (2) with respect to the hinge (9) with a progressive increase (FIG. 8, FIG. 9) of a second angle (B) included between the axis of the body (29), which is lifted, and the axis of the extension element (33), which is maintained parallel in this phase, preferably aligned, with respect to the axis of the screw (32).

Automatically and in a continuous way without interruption of the extraction action of the cork (21), there is the passage from the first sub-phase to the second sub-phase. The passage occurs automatically when, following the described conjoint rotation of extension element (3) and extraction screw (5), a first backing surface (16) present on the body (29) of the corkscrew comes into contact with a respective second backing surface (24) present on the extension element (3). Following the coming into reciprocal contact of the two backing surfaces (16, 24), the rotation of the assembly of extension element (3) and extraction screw (5) around the first fulcrum (8) is blocked. This blocking position of the first rotation phase, corresponding to the end of the first extraction sub-phase, is defined by the inclination of the second backing surface (24) present on the extension element (3) with respect to the axis of the extension element (33). Preferably the blocking position of the first rotation phase is defined in such a way that, in this position, the axis of the extension element (33) forms a second angle (B) of approximately 90° with respect to the axis of the body (30) of the corkscrew (1). In general the axis of the extension element (33) can form a second angle (B) with values included between 80° and 100° with respect to the axis of the body (30) of the corkscrew (1) without going beyond the scope of the present invention, also according to the form of the body (29).

Proceeding (FIG. 6) with the extraction, that is maintaining the exertion of the opening force (27), with the rotation around the first fulcrum (8) blocked by the condition of reciprocal interference between first backing surface (16) and second backing surface (24), the rotation around the first fulcrum (8) being blocked, a rotation starts only of the extraction screw (5) around the second fulcrum (7) while the extension element (3) remains still in the blocking position defined by the reciprocal interference of the two backing surfaces (16, 24). In this case also the exerted force ratio changes because preferably the second fulcrum (7) and the hinge (9) are spaced (FIG. 5, FIG. 6) by a second distance (D2) greater than the first distance (D1) between first fulcrum (8) and hinge (9). That is to say the lever ratio changes, thus having a multiplying effect of the lever most favourable for the extraction of the end part of the cork (21) also obtaining an acceleration of the extraction for the completion of the second part of the cork (21). In this phase, the axis of the extension element (33) remains fixed with respect to the body (29) while the axis of the extraction screw (5), following the progressive rotation around the second fulcrum (7), is progressively inclined as the extraction proceeds, so that the first angle (A) changes formed between the axis of the screw (32) and the axis (33) of the extension element while simultaneously the value further increases of the angle included between the axis of the body (29), which is lifted, and the axis of the screw (32) which in this phase, in turn, tilts with respect to the axis of the extension element (33). Advantageously, the extraction of the cork (21) is obtained with a single uninterrupted extraction movement also having an additional further advantage which, as can be clearly seen in the figures (FIG. 8, FIG. 9, FIG. 10, FIG. 11, FIG. 12, FIG. 13, FIG. 14), relates to the fact that the extraction of the cork (21) from the neck of the bottle (22) occurs, especially in the second extraction sub-phase (FIG. 11, FIG. 12, FIG. 13, FIG. 14), perfectly vertically so that the axis of the cork is aligned with the axis of the extraction screw, in such a way as to avoid the breakage of the cork, besides allowing an easier uncorking. This is due to the fact that the second uncorking sub-phase develops inwards, that is with a progressive reduction of the first angle (A) formed between the axis of the screw (32) and the axis (33) of the extension element while simultaneously the value further increases of the angle included between the axis of the body (29), which is lifted, and the axis of the screw (32) which in this phase, in turn, tilts with respect to the axis of the extension element (33) taking a position in which the axis of the screw (32) remains parallel to the axis of the cork thanks to the rotation allowed by the second fulcrum (7).

Advantageously, thanks to the hinge (9), the extraction movement occurs according to a condition in which the axis (30) of the lever remains essentially fixed with respect to the bottle and to the point of engagement of the teeth (10) on the neck of the bottle, favouring the stability of the propping.

Figure 15:
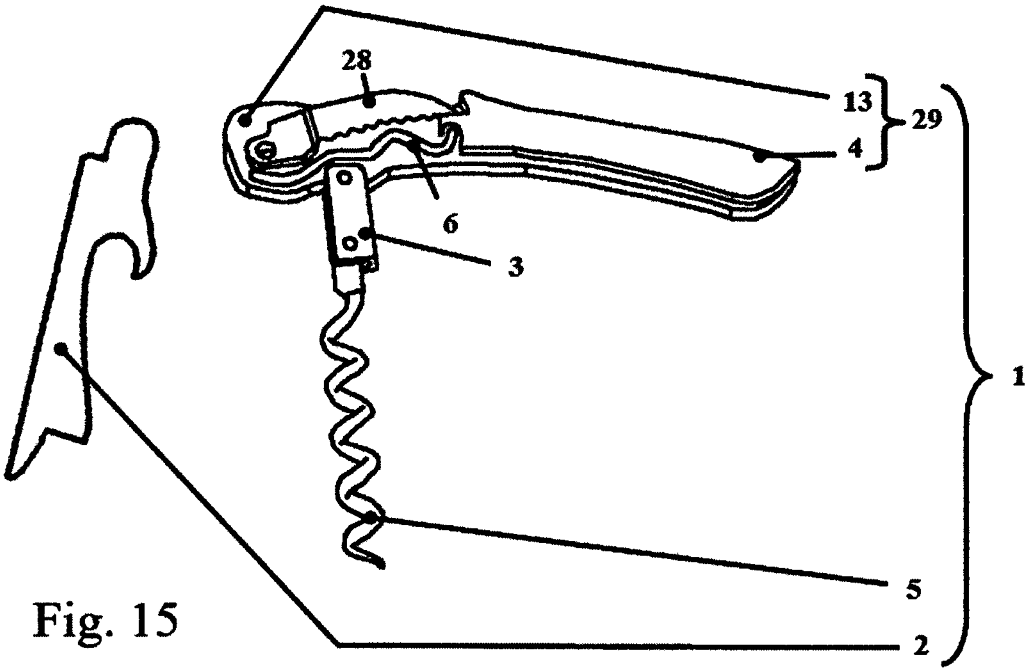
FIG. 15 is a view of the inventive corkscrew in which some components have been removed to allow to see the internal arrangement.

A first elastic means (6), for example in the form (FIG. 15) of a shaped elastic bar, acts on the assembly of extraction screw and extension element, in such a way as to counteract a free rotation of the assembly to firmly maintain the assembly in position with respect to the body and avoid that the assembly swings freely, for example during the preliminary phases of preparation of the corkscrew or after the conclusion of the extraction. The first elastic means acts, for example, between an embedment hollow obtained inside the handle and a pin of the hinge (9).

Figure 16:
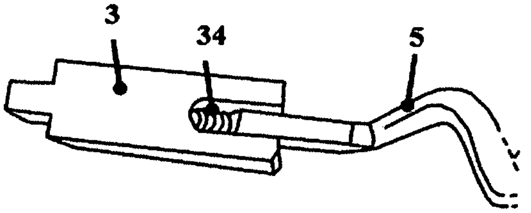
FIG. 16 is a view of one particular of the assembly of an extension element and relative extraction screw of the inventive corkscrew.

A second elastic means (34), for example in the form of a small compression spring (FIG. 16) can be present in the assembly of extension element and relative extraction screw for holding in position the extraction screw with respect to the extension element, so that the extraction screw is not free to swing with respect to the extension element.

Advantageously, the actuation action exercised for the extraction also acts as a force for the maintenance of the first extraction configuration, preventing the rotation around the second fulcrum point (7) from starting before reaching the blocking position of the rotation around the first fulcrum point (8). Indeed, the actuation force exercised on the handle results in a traction force which acts on the extraction screw according to a direction aligned with the extension element, contributing to the maintenance of the alignment condition of the respective axes.

In conclusion the present invention refers to a corkscrew (1) for extraction of a cork (21) from a neck of a bottle (22), comprising (FIG. 1, FIG. 2, FIG. 4):

a body (29) provided with a grasping handle (4) and with an end head (13) supported by the handle (4);

a propping lever (2) provided with at least one couple of teeth (10) for propping support on an edge (23) of the neck of the bottle (22) and further in which the lever (2) is hinged by means of a hinge (9) to the body (29) in correspondence with the head (13);

an extraction screw (5) for extraction of the cork (21) for insertion by means of screwing within the volume of the cork (21), in which the screw (5) has a spiral longitudinal development;

a first fulcrum (8) for pivotable coupling of the extraction screw (5) to the body (29) in correspondence with the head (13), the first fulcrum (8) being located in a position of the head (13) which is spaced with respect to the hinge (9) and located between the hinge (9) and the handle (4).

The corkscrew (1) further includes an extension element (3) constituting a fixing interface of the extraction screw (5) with respect to the first fulcrum (8) according to a configuration in which the extension element (3) is coupled to the body (29) in correspondence with the first fulcrum (8) and the extraction screw (5) is pivotably coupled to the extension element (3) by means of a second fulcrum (7), the assembly of extension element (3) and extraction screw (5) being provided with two fulcra (7, 8), that is first fulcrum (8) and second fulcrum (7), arranged one after the other.

Thanks to the shape described, the corkscrew (1) is configurable between two extraction configurations of the cork (21) having different angulation values of a first angle (A) which is the angle formed between an axis of the extension element (33) joining first fulcrum (8) and second fulcrum (7) and an axis of the screw (32), which is the axis of the spiral longitudinal development of the screw (5), in which:

a first configuration (FIG. 3, FIG. 4, FIG. 5, FIG. 8, FIG. 9, FIG. 10), for a corresponding first extraction sub-phase of the cork, is characterised by a value of the first angle (A) included between 170° and 190°, preferably equal to about 180°;

a second configuration (FIG. 6, FIG. 7, FIG. 11, FIG. 12, FIG. 13, FIG. 14) for a corresponding second extraction sub-phase of the cork is characterised by values of the first angle (A) smaller with respect to the value of the first angle (A) of the first extraction configuration.

The second extraction configuration is characterised by values of the first angle (A) included between 80° and 170°.

In the first extraction configuration, during the corresponding first extraction sub-phase of the cork, the first angle (A) maintains a fixed value for rotation of the assembly of extension element (3) and extraction screw (5) around the first fulcrum (8).

In the second extraction configuration, during the corresponding second extraction sub-phase of the cork, the first angle (A) has progressively lower values during the progress of the second extraction sub-phase of the cork for rotation of the extraction screw (5) with respect to the extension element (3) around the second fulcrum (7).

In the first extraction configuration, during the corresponding first extraction sub-phase of the cork, a second angle (B) formed between the axis of the extension element (33) and an axis of longitudinal development of the body (30) of the corkscrew (1) is included between 15° and 100°.

In the second extraction configuration, during the corresponding second extraction sub-phase of the cork, the second angle (B) is included between 80° and 100°.

In the first extraction configuration, during the corresponding first extraction sub-phase of the cork, the second angle (B) has progressively lower values during the progress of the first extraction sub-phase of the cork, for rotation of the extension element (3) with respect to the body (29) of the corkscrew (1) around the first fulcrum (8).

In the second extraction configuration, during the corresponding second extraction sub-phase of the cork, the second angle (B) maintains a fixed value in the absence of rotation of the extension element (3) with respect to the first fulcrum (8) and with rotation of the extraction screw (5) around the second fulcrum (7).

The body (29) includes a first backing surface (16) located close to the first fulcrum (8) and the extension element (3) includes a second backing surface (24) arranged according to a configuration in which a condition of reciprocal contact between the first backing surface (16) and the second backing surface (24) constitutes a blocking condition of the pivotable coupling of the first fulcrum (8) between extraction screw (5) and body (29). In the first configuration for the corresponding first extraction sub-phase of the cork, the first backing surface (16) and the second backing surface (24) are not in a condition of reciprocal contact with consequent condition of free rotation of the pivotable coupling of the first fulcrum (8) between extraction screw (5) and body (29). In the second configuration for the corresponding second extraction sub-phase of the cork, the first backing surface (16) and the second backing surface (24) are in a condition of reciprocal contact with consequent blocking condition of the rotation of the pivotable coupling of the first fulcrum (8) between extraction screw (5) and body (29).

The present invention also refers to an extraction method of a cork (21) from a neck of a bottle (22) by means of an extraction corkscrew (1), in which the corkscrew (1) includes:

a body (29) provided with a grasping handle (4) and with an end head (13) supported by the handle (4);

a propping lever (2) provided with at least one couple of teeth (10) for propping support on an edge (23) of the neck of the bottle (22) and further in which the lever (2) is hinged by means of a hinge (9) to the body (29) in correspondence with the head (13);

an extraction screw (5) of the cork (21) for insertion by means of screwing within the volume of the cork (21), in which the screw (5) has a spiral longitudinal development;

a first fulcrum (8) for pivotable coupling of the extraction screw (5) to the body (29) in correspondence with the head (13), the first fulcrum (8) being located in a position of the head (13) which is spaced with respect to the hinge (9) and located between the hinge (9) and the handle (4).

The method includes a screwing phase of the extraction screw (5) into the cork (21) for introduction of the screw (5) within the volume of the cork (21) and a bearing phase of the propping lever (2) on the edge (23) of the neck of the bottle (22) by means of bearing of the at least one couple of teeth (10) on the edge (23) of the neck of the bottle (22). The extraction phase is divided into two sub-phases of which:

a first sub-phase in which the extraction occurs by means of a rotation phase of an assembly consisting of the extraction screw (5) and an extension element (3) constituting a fixing interface of the extraction screw (5) with respect to the first fulcrum (8) according to a configuration in which the extension element (3) is coupled to the body (29) in correspondence with the first fulcrum (8) and the extraction screw (5) is pivotably coupled to the extension element (3) by means of a second fulcrum (7), the assembly extension element (3) and extraction screw (5) being provided with two fulcra (7, 8), that is first fulcrum (8) and second fulcrum (7) arranged one after the other, the first sub-phase occurring by means of rotation of the assembly of extraction screw (5) and extension element (3) around the first fulcrum (8) in the absence of rotation of the extraction screw (5) around the second fulcrum (7);

a second sub-phase in which the extraction occurs by means of a rotation phase of the extraction screw (5) around the second fulcrum (7) in the absence of rotation of the extension element (3) around the first fulcrum (8).

The extraction method includes a blocking phase of the first sub-phase for the start of the second extraction sub-phase, in which the blocking phase occurs by means of interference between the previously described first backing surface (16) of the body (29) and second backing surface (24) of the extension element (3).

Advantageously with the method described, the extraction phase, composed of the two sub-phases consisting of first extraction sub-phase and second extraction sub-phase, occurs by means of lifting movement of the grasping handle (4), in which the lifting movement is continuous and without interruptions between the start of the extraction, the passage from first extraction sub-phase to second extraction sub-phase, end of the extraction.

The description of the present invention has been made with reference to the enclosed figures in one preferred embodiment of it, but it is evident that a lot of possible changes, modifications and variations will be immediately clear to those skilled in the art in the light of the previous description. Thus, it must be underlined that the invention is not limited to the previous description, but it includes all the changes, modifications and variations in accordance with the appended claims.

NOMENCLATURE USED

With reference to the identification numbers in the enclosed figures, the following nomenclature has been used:

1. Corkscrew
2. Lever
3. Extension element
4. Handle
5. Extraction screw
6. First elastic means
7. Second fulcrum
8. First fulcrum
9. Hinge
10. Teeth
11. First tooth
12. Second tooth
13. Head
14. Seat
15. Protrusion
16. First backing surface
17. Opening hook for crown cork
18. Free space
19. First flank
20. Second flank
21. Insertion cork
22. Bottle
23. Edge
24. Second backing surface
25. First end
26. Second end
27. Opening force
28. Blade
29. Body
30. Axis of the body
31. Axis of the lever
32. Axis of the screw
33. Axis of the extension element
34. Second elastic means
A. First angle
B. Second angle
D1. First distance
D2. Second distance

The invention claimed is:

1. Corkscrew for extraction of a cork from a neck of a bottle, the corkscrew comprising:

a body provided with a grasping handle and an end head supported by the handle;

a propping lever provided with at least one couple of teeth for propping support on an edge of the neck of the bottle and further in which the lever is hinged by a hinge to the body in correspondence with the head;

an extraction screw for extraction of the cork by insertion by means of screwing within the volume of the cork in which the screw has a spiral longitudinal development;

a first fulcrum for pivotable coupling of the extraction screw to the body in correspondence with the head, the first fulcrum being located in a position of the head which is spaced with respect to the hinge and located between the hinge and the handle;

in which the corkscrew further includes an extension element constituting a fixing interface of the extraction screw with respect to the first fulcrum according to a configuration in which the extension element is coupled to the body in correspondence with the first fulcrum and the extraction screw is pivotably coupled to the extension element by means of a second fulcrum, the assembly of extension element and extraction screw being provided with two fulcra, comprising a first fulcrum and a second fulcrum, in which the corkscrew is configurable between two extraction configurations of the cork having different angulation values of a first angle (A), which is the angle formed between an axis of the extension element joining first fulcrum and second fulcrum and an axis of the screw which is the axis of the spiral longitudinal development of the screw, in which:

a first extraction configuration for a corresponding first extraction sub-phase of the cork is characterised by a value of the first angle (A) between 170° and 190° , preferably equal to about 180°;

a second extraction configuration for a corresponding second extraction sub-phase of the cork is characterised by values of the first angle (A) smaller than the value of the first angle (A) of the first extraction configuration, characterized in that in the first extraction configuration, during the corresponding first extraction sub-phase of the cork, the first angle (A) has a fixed value for rotation of the assembly of extension element and extraction screw around the first fulcrum, an actuation force on the handle being corresponding to a traction force on the extraction screw according to a direction aligned with the extension element, a first backing surface being present on the body of the corkscrew and a second backing surface being present on the extension element arranged according to a configuration in which a condition of reciprocal contact between the first backing surface and the second backing surface constitutes a blocking condition of the pivotable coupling of the first fulcrum between extraction screw and body for automatic passage from the first extraction configuration to the second extraction configuration for a continuous extraction movement of the cork.

2. Corkscrew according to claim 1, wherein the second extraction configuration is characterised by values of the first angle (A) between 80° and 170°, with the exclusion of 170° being the values of the second extraction configuration lower with respect to the first value of the first angle (A) in the first configuration.

3. Corkscrew according to claim 1, wherein in the second extraction configuration, during the corresponding second extraction sub-phase of the cork, the first angle (A) has progressively lower values during the progress of the second extraction sub-phase of the cork for rotation of the extraction screw with respect to the extension element around the second fulcrum.

4. Corkscrew according to claim 1, wherein in the first extraction configuration, during the corresponding first extraction sub-phase of the cork, a second angle (B) formed between the axis of the extension element and an axis of longitudinal development of the body of the corkscrew is between 15° and 100°.

5. Corkscrew according to claim 4, wherein in the second extraction configuration, during the corresponding second extraction sub-phase of the cork, the second angle (B) is between 80° and 100°.

6. Corkscrew according to claim 4, wherein in the first extraction configuration, during the corresponding first extraction sub-phase of the cork, the second angle (B) has progressively lower values during the progress of the first extraction sub-phase of the cork for rotation of the extension element with respect to the body of the corkscrew around the first fulcrum.

7. Corkscrew according to claim 4, wherein in the second extraction configuration, during the corresponding second extraction sub-phase of the cork, the second angle (B) has a fixed value in the absence of rotation of the extension element with respect to the first fulcrum and with rotation of the extraction screw around the second fulcrum.

8. Corkscrew according to claim 1, wherein in that the first backing surface is located close to the first fulcrum.

9. Corkscrew according to claim 1, wherein in the first extraction configuration for the corresponding first extraction sub-phase of the cork, the first backing surface and the second backing surface are not in a condition of reciprocal contact with consequent condition of free rotation of the pivotable coupling of the first fulcrum between extraction screw and body.

10. Corkscrew according to claim 1, wherein in the second extraction configuration for the corresponding second extraction sub-phase of the cork, the first backing surface and the second backing surface are in a condition of reciprocal contact with consequent blocking condition of the rotation of the pivotable coupling of the first fulcrum between extraction screw and body.

11. Extraction method of a cork from a neck of a bottle by means of an extraction corkscrew, in which the corkscrew includes:

a body provided with a grasping handle and with an end head supported by the handle;

a propping lever provided with at least one couple of teeth for propping support on an edge of the neck of the bottle and further in which the lever is hinged, by a hinge to the body, in correspondence with the head;

a screw for extraction of the cork by insertion, by means of screwing within the volume of the cork, in which the screw has a spiral longitudinal development;

a first fulcrum for pivotable coupling of the extraction screw to the body in correspondence with the head, the first fulcrum being located in a position of the head which is spaced with respect to the hinge and located between the hinge and the handle;

in which the corkscrew is configurable between two extraction configurations of the cork having different angulation values of a first angle (A), which is the angle formed between an axis of the extension element joining the first fulcrum and the second fulcrum and an axis of the screw which is the axis of the spiral longitudinal development of the screw, in which:

a first extraction configuration for a corresponding first extraction sub-phase of the cork is characterised by a value of the first angle (A) between 170° and 190°, preferably equal to about 180°;

a second extraction configuration for a corresponding second extraction sub-phase of the cork is characterised by values of the first angle (A) smaller than the value of the first angle (A) of the first extraction configuration, in the first extraction configuration, during the corresponding first extraction sub-phase of the cork, the first angle (A) having a fixed value for rotation of the assembly of extension element and extraction screw around the first fulcrum, the method comprising a screwing phase of the extraction screw in the cork for insertion of the screw within the volume of the cork and a bearing phase of the propping lever on the edge of the neck of the bottle by means of bearing of the at least one couple of teeth on the edge of the neck of the bottle, the method being characterized in that the corkscrew is made according to claim 1, and the extraction phase is divided into two sub-phases of which:

said first extraction sub-phase corresponding to said first extraction configuration, in which the extraction occurs by means of a rotation phase of an assembly constituted by the extraction screw and an extension element constituting a fixing interface of the extraction screw with respect to the first fulcrum, according to a configuration in which the extension element is coupled to the body in correspondence with the first fulcrum and the extraction screw is pivotably coupled to the extension element by means of a second fulcrum, the assembly of extension element and extraction screw being provided with two fulcra, that is a first fulcrum and second fulcrum arranged one after the other, the first extraction sub-phase occurring by means of rotation of the assembly of extraction screw and extension element around the first fulcrum in the absence of rotation of the extraction screw around the second fulcrum;

said second extraction sub-phase corresponding to said second extraction configuration, in which the extraction occurs by means of a rotation phase of the extraction screw around the second fulcrum, in the absence of rotation of the extension element around the first fulcrum;

the extraction phase occurring by means of lifting movement of the grasping handle and comprising said two sub-phases consisting of first extraction sub-phase and second extraction sub-phase, in which during the corresponding first extraction sub-phase of the cork, the first angle (A) has said fixed value for rotation of the assembly of extension element and extraction screw around the first fulcrum for execution of a lifting movement which is continuous and without interruptions between the start of the extraction, the passage from first extraction sub-phase to second extraction sub-phase, end of the extraction, the method including a blocking phase of the first extraction sub-phase for the start of the second extraction sub-phase in which the blocking phase occurs by means of interference between:

a first backing surface of the body, in which the first backing surface is located close to the first fulcrum;

a second backing surface of the extension element;

the first backing surface and second backing surface being arranged according to a configuration in which, following the rotation of the assembly constituted by extraction screw and extension element, a condition of reciprocal contact occurs between the first backing surface and the second backing surface corresponding to said blocking phase, which causes a blocking condition of the pivotable coupling of the first fulcrum between extraction screw and body for the start of the second extraction sub-phase.

12. Extraction method of a cork according to claim 11, wherein the second extraction sub-phase is characterised by values of the first angle (A) between 80° and 170°, with the exclusion of 170° being the values of the second extraction configuration lower with respect to the first value of the first angle (A) in the first configuration.

13. Extraction method of a cork according to claim 11, wherein during the first extraction sub-phase of the cork, the first angle (A) maintains a fixed value with corresponding rotation phase of the assembly of extension element and extraction screw around the first fulcrum.

14. Extraction method of a cork according to claim 11, wherein during the second extraction sub-phase of the cork, the first angle (A) has progressively lower values during the progress of the second extraction sub-phase of the cork with corresponding rotation phase of the extraction screw with respect to the extension element around the second fulcrum.

15. Extraction method of a cork according to claim 11, wherein during the first extraction sub-phase of the cork, a second angle (B) formed between the axis of the extension element and an axis of longitudinal development of the body of the corkscrew is between 15° and 100°.

16. Extraction method of a cork according to claim 15, wherein during the second extraction sub-phase of the cork, the second angle (B) is between 80° and 100°.

17. Extraction method of a cork according to claim 15, wherein during the first extraction sub-phase of the cork, the second angle (B) has progressively lower values during the progress of the first extraction sub-phase of the cork for rotation of the extension element with respect to the body of the corkscrew around the first fulcrum.

18. Extraction method of a cork according to claim 15, wherein during the second extraction sub-phase of the cork, the second angle (B) maintains a fixed value in the absence of rotation of the extension element with respect to the first fulcrum and with rotation of the extraction screw around the second fulcrum.

* * * * *